(12) United States Patent
Wang et al.

(10) Patent No.: US 7,550,681 B2
(45) Date of Patent: Jun. 23, 2009

(54) METHOD AND APPARATUS FOR MEASURING WEIGHT OF CNC WORKPIECES

(75) Inventors: Shih-Ming Wang, Tao-Yuan (TW); Ming-Hua Li, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 59 days.

(21) Appl. No.: 11/754,217

(22) Filed: May 25, 2007

(65) Prior Publication Data

US 2008/0289882 A1 Nov. 27, 2008

(51) Int. Cl.
*G01G 7/00* (2006.01)
*B25B 5/00* (2006.01)

(52) U.S. Cl. .................... 177/1; 700/114; 700/182; 82/118; 318/652

(58) Field of Classification Search .......... 177/1, 177/16, 145, 210 R; 700/114, 182; 318/652; 82/118
See application file for complete search history.

(56) References Cited

U.S. PATENT DOCUMENTS

| | | | | |
|---|---|---|---|---|
| 3,722,660 A | * | 3/1973 | Snead | 177/16 |
| 3,942,625 A | * | 3/1976 | Snead | 198/810.01 |
| 5,393,939 A | * | 2/1995 | Nasuta et al. | 177/145 |
| 5,430,476 A | * | 7/1995 | Hafele et al. | 348/70 |
| 5,994,650 A | * | 11/1999 | Eriksson et al. | 177/45 |
| 6,317,656 B1 | * | 11/2001 | Kira | 700/282 |
| 6,502,002 B2 | * | 12/2002 | Susnjara et al. | 700/95 |
| 7,117,056 B2 | * | 10/2006 | Balic | 700/104 |
| 7,193,162 B2 | * | 3/2007 | McIsaac et al. | 177/1 |
| 2002/0088317 A1 | * | 7/2002 | Chen | 82/118 |
| 2003/0187624 A1 | * | 10/2003 | Balic | 703/1 |
| 2005/0251284 A1 | * | 11/2005 | Balic | 700/182 |
| 2008/0234852 A1 | * | 9/2008 | Wang et al. | 700/114 |

* cited by examiner

*Primary Examiner*—Randy W Gibson
(74) *Attorney, Agent, or Firm*—WPAT.P.C.; Justin King

(57) ABSTRACT

This invention discloses a method and apparatus for measuring the weight of a CNC workpiece. As the weight of the workpiece on a loading platform increases, the loading of a driving module which drives the loading platform in constant speed increases accordingly. On the contrary, as the weight of the workpiece on the loading platform decreases, the loading of the driving module which drives the loading platform in constant speed also decreases. This invention determines the weight of the workpiece on the loading platform by measuring the electrical signal which drives the driving module and utilizing a calibration curve data in a preconfigured database.

22 Claims, 4 Drawing Sheets

METHOD AND APPARATUS FOR MEASURING WEIGHT OF CNC WORKPIECES

BACKGROUND OF THE INVENTION

1. Field of the Invention

The present invention generally relates to a method and apparatus for measuring weight, more particularly, a method and apparatus for measuring the weight of a CNC (Computer Numerical Control) workpiece.

2. Description of the Prior Art

A Computer Numerical Control (CNC) machine tool is used to shape a workpiece by removing a certain amount of unwanted material from the workpiece, thus reducing the weight of the workpiece and changing its inertia. As shown in FIG. 1, when certain amount is removed from a workpiece 105 by a conventional CNC machine tool 100, the workpiece is required to be unloaded from the loading platform and weighed by a weighing scale. The weight information is then entered into the CNC machine tool, so as to adjust relevant control parameters such that the machined contour conforms to a predicted contour 110, thereby obtaining optimal accuracy of the servo control. However, since there are a variety of machining applications and dynamic conditions (e.g. change of loading), it is difficult to obtain an optimal servo-control result for various kinds of machining applications with only a single set of fixed control parameters. As a result, for example as shown in FIG. 1, an error may occur between the actual contour 115 created and the predicted contour 110. Therefore, there is a need for a method and apparatus that can detect the weight of the workpiece in real time during CNC machining process that enhances the performance and accuracy of the CNC machine tool, thereby, for example, the surface precision of the workpiece is increased and the operating time and tracking error are reduced.

SUMMARY OF THE INVENTION

In view of the prior art and the needs of the related industries, the present invention provides a method and apparatus for measuring the weight of a CNC workpiece that solves the abovementioned shortcomings of the conventional CNC machining processes.

One objective of the present invention is to provide an apparatus for measuring the weight of a workpiece for a CNC machine tool. The weight of the workpiece being machined is derived by determining the magnitude of an electrical signal received by a driving module that drives a loading platform in constant speed. Then, control parameters of the CNC machine tool can be adjusted/calibrated to reduce the complexity of human operations and enhance precision of servo control of the CNC machine tool.

Another objective of the present invention is to provide an apparatus for measuring the weight of a CNC workpiece. The apparatus can detect the magnitude of an electrical signal and compare a calibrated curve data in a preconfigured database, thereby deriving the weight of the workpiece.

Yet another objective of the present invention is to provide a method for measuring the weight of a CNC workpiece. The method is able to determine the weight of a workpiece on a loading platform by detecting an electrical signal that causes a driving module to drive the loading platform in constant speed.

According to the above objectives, the present invention discloses an apparatus for measuring the weight of a CNC workpiece. As the weight of the workpiece on a loading platform increases, the loading of a driving module which drives the loading platform in constant speed increases accordingly. On the contrary, as the weight of the workpiece on the loading platform decreases, the loading of the driving module which drives the loading platform in constant speed also decreases. This invention derives the weight of the workpiece on the loading platform by measuring the electrical signal which drives the driving module and utilizing a calibration curve data in a preconfigured database.

According to the above objectives, the present invention discloses a method for measuring the weight of a CNC workpiece. First, a workpiece is provided on a loading platform that includes a driving module. Second, a power supply module supplies an electrical signal to the driving module. Then, the driving module drives the loading platform in constant speed based on the electrical signal. Thereafter, a determining module is provided, wherein the determining module detects a continuous data of the electrical signal and determines the weight of the workpiece based on the continuous data.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

The present invention is directed to a method and apparatus for measuring the weight a CNC workpiece. Detailed steps and constituents are given below to assist in the understanding the present invention. Obviously, the implementations of the present invention are not limited to the specific details known by those skilled in the art of CNC weight measuring method and apparatus. On the other hand, well-known steps or constituents of digital watermarking are not described in details in order not to unnecessarily limit the present invention. Detailed embodiments of the present invention will be provided as follow. However, apart from these detailed descriptions, the present invention may be generally applied to other embodiments, and the scope of the present invention is thus limited only by the appended claims.

Figure 1:
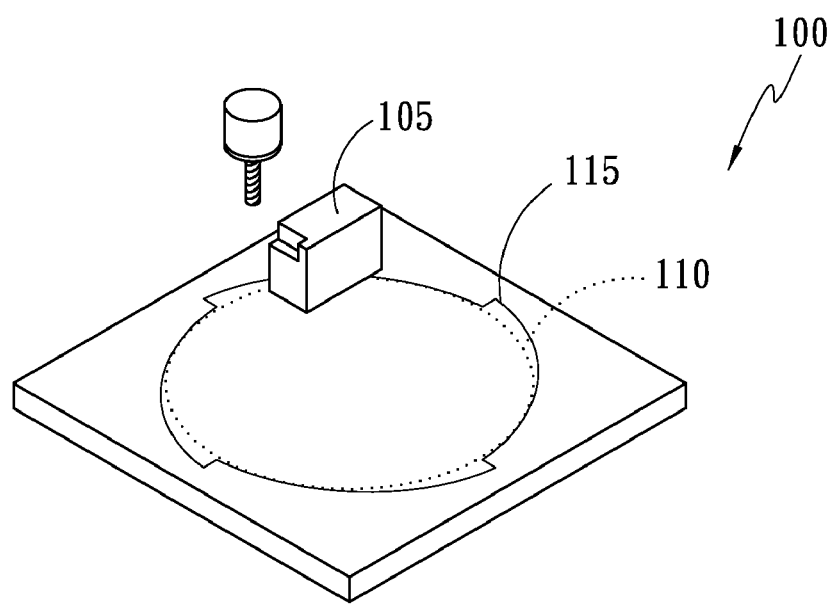
FIG. 1 is a schematic diagram illustrating a conventional CNC machine tool during operation.
Figure 2:
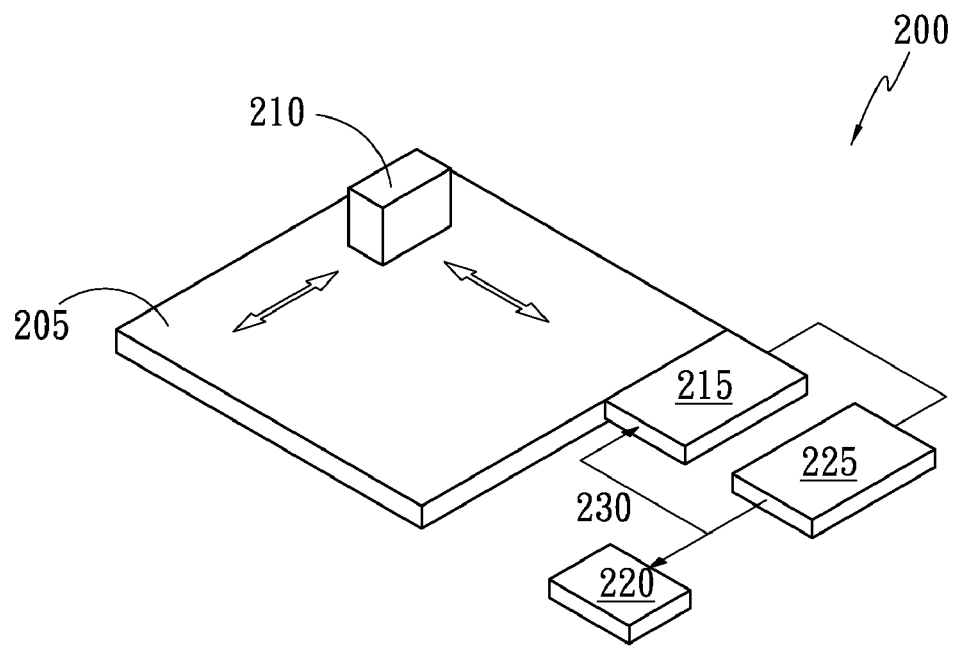
FIG. 2 is a schematic diagram depicting an apparatus for measuring the weight of a CNC workpiece.

Referring to FIG. 2, a first embodiment of the present invention is an apparatus for measuring the weight of workpieces 200, which includes a loading platform 205, a workpiece 210, a driving module 215, a power supply module 225 and a determining module 220. The workpiece 210 is secured on the loading platform 205. The driving module 215 is used to drive the loading platform 205 in constant speed, wherein the magnitude of the force with which the driving module 215 drives the loading platform in constant speed depends on an electrical signal 230 provided by the power supply module 225 received by the driving module 215. The determining module 220 may receive this electrical signal 230 and determine the weight of the workpiece 210 according to the magnitude of the electrical signal 230.

The driving module 215 can be a servo motor. The electrical signal 230 can be a current, voltage or other electrical signal. The electrical signal 230 includes a current for a horizontal servo motor and a current for a vertical servo motor. The electrical signal 230 includes an electrical signal for causing the loading platform 205 to move from a first location to a second location, and an electrical signal for moving from the second location back to the first location. The driving module 215 includes a horizontal servo motor and a vertical servo motor. The power supply module 225 detects the velocity of the loading platform 205, and outputs the electrical signal 230 that keeps the loading platform 205 moving in constant speed based on the detected velocity.

The determining module 220 includes a database for storing weight information about different workpieces 210 and data of the electrical signals corresponding to the weight of the various workpieces 210. The determining module 220 may include a neural network, which outputs the weight of the workpiece 210 based on the electrical signal. The neural network is trained according to the weights of the different workpieces 210 and the data of the electrical signals corresponding to the weight of the various workpieces 210. Since the driving module 215 must maintain a constant rotational speed for the precision of machine control and driving the loading platform 205 in constant speed, when the weight of the workpiece 210 changes, the electrical signal 230 received by the driving module 215 will vary accordingly, thus the weight of the workpiece 210 corresponding to the received electrical signal 230 can be determined.

Figure 3:
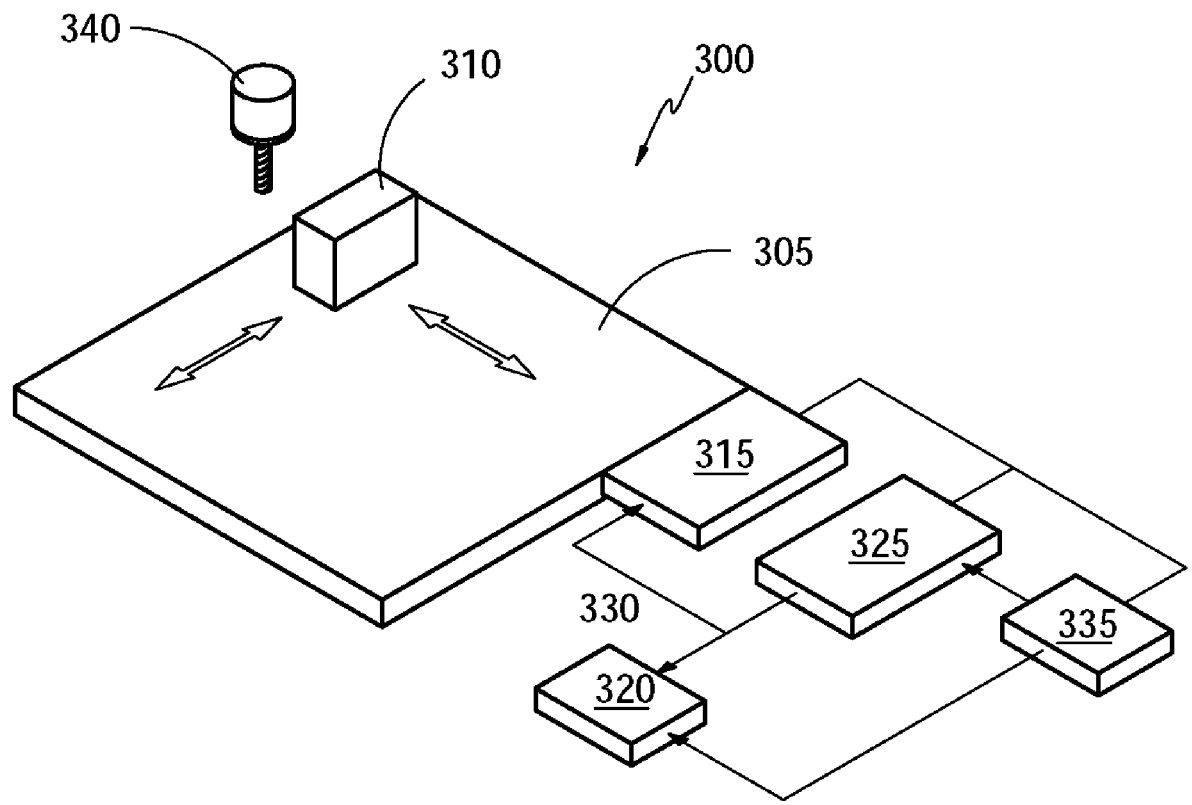
FIG. 3 is a schematic diagram depicting a CNC machine tool integrated with the apparatus for measuring the weight of a CNC workpiece.

Referring to FIG. 3, a second embodiment of the present invention is a CNC machine tool 300 that includes an apparatus for measuring the weight of CNC workpieces and a control unit 335. The CNC machine tool 300 includes a loading platform 305, a workpiece 310, a driving module 315, a power supply module 325, a milling cutter 340, a control unit 335 and a determining module 320. The workpiece 310 is secured on the loading platform 305. The driving module 315 is used to drive the loading platform 305 in constant speed, wherein the magnitude of the force with which the driving module 315 drives the loading platform in constant speed depends on an electrical signal 330 provided by the power supply module 325 received by the driving module 315. The determining module 320 may receive the electrical signal 330, and detect its magnitude and determine the weight of the workpiece 310. With the weight of the workpiece 310 being inputted into the control unit 335, the control unit 335 can adjust/calibrate the fine-tuning parameters of the CNC machine tool 300 to reduce complicated human operations and enhance machining precision of the CNC machine tool 300.

The driving module 315 is a servo motor. The electrical signal 330 can be a current, voltage or other electrical signal. The electrical signal 330 includes a current for a horizontal servo motor and a current for a vertical servo motor. The electrical signal 330 includes an electrical signal for causing the loading platform 205 to move from a first location to a second location, and an electrical signal for moving from the second location back to the first location. The driving module 315 includes a horizontal servo motor and a vertical servo motor. The power supply module 325 detects the velocity of the loading platform 305, and outputs the electrical signal 330 that keeps the loading platform 305 moving in constant speed based on the detected velocity.

The determining module 320 includes a database for storing weight information about different workpieces 310 and data of the electrical signals corresponding to the weight of the various workpieces 310. The determining module 320 may include a neural network, which outputs the weight of the workpiece 310 based on the electrical signal 330. The neural network is trained according to the weights of the different workpieces 210 and the data of the electrical signals 330 corresponding to the weight of the various workpieces 310. Since the driving module 315 must maintain a constant rotational speed for the precision of machine control and driving the loading platform 305 in constant speed, when the weight of the workpiece 310 changes, the electrical signal 330 received by the driving module 315 will vary accordingly, thus the weight of the workpiece 310 corresponding to the received electrical signal 330 can be determined.

Figure 4:
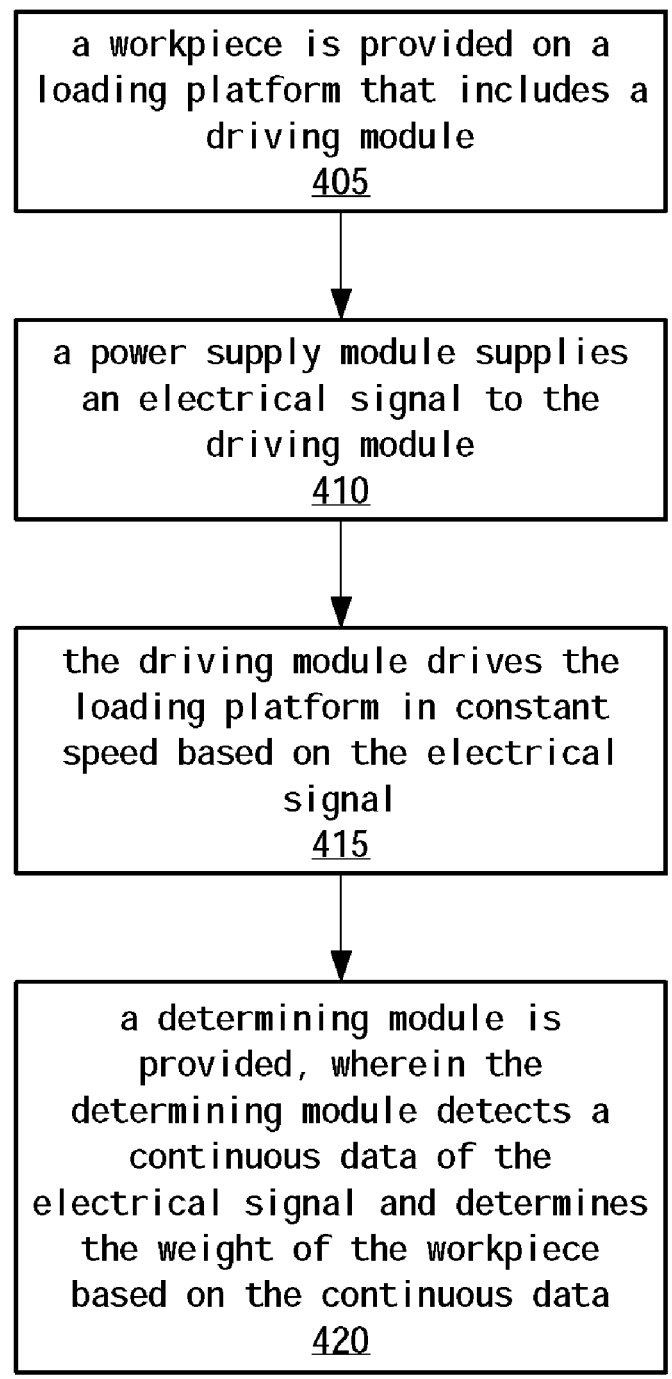
FIG. 4 is a flow chart illustrating a method for measuring the weight of a CNC workpiece.

Referring to FIG. 4, a third embodiment of the present invention is a method for measuring the weight of workpieces. First, a workpiece is provided on a loading platform that includes a driving module, as shown in step 405. Second, a power supply module supplies an electrical signal to the driving module, as shown in step 410. Then, the driving module drives the loading platform in constant speed based on the electrical signal, as shown in step 415. Thereafter, a determining module is provided, wherein the determining module detects a continuous data of the electrical signal and determines the weight of the workpiece based on the continuous data, as shown in step 420. The driving module is a servo motor. The electrical signal can be a current, voltage or other electrical signal. The electrical signal includes a current for a horizontal servo motor and a current for a vertical servo motor. The electrical signal includes an electrical signal for causing the loading platform to move from a first location to a second location, and an electrical signal for moving from the second location back to the first location. The driving module includes a horizontal servo motor and a vertical servo motor. The power supply module detects the velocity of the loading platform, and outputs the electrical signal that keeps the loading platform moving in constant speed based on the detected velocity.

The determining module may further include a database for storing weight information about different workpieces and data of the electrical signals corresponding to the weight of the various workpieces. The determining module may include a neural network, which outputs the weight of the workpiece based on the electrical signal. The neural network is trained according to the weights of the different workpieces and the data of the electrical signals corresponding to the weight of the various workpieces. Since the driving module must maintain a constant rotational speed for the precision of machine control and driving the loading platform in constant speed, when the weight of the workpiece changes, the electrical signal received by the driving module will vary accordingly. By receiving the electrical signal and analyzing the relationship between the electrical signal and the workpiece, the weight of the workpiece can be determined based on the value of the electrical signal. A preferred embodiment of the present embodiment further includes a step of entering the weight of the workpiece into a CNC machine tool integrated control unit, wherein the step includes adjust/calibrate the control parameters of the CNC machine tool by inputting the weight of the workpiece into the control unit.

EXAMPLE 1

When a workpiece is cut, its weight will change. This means control parameters related to the inertia of the CNC machine tool will have to be adjusted. One effect of the present invention eliminates the need of unloading/loading the workpiece and resetting position etc., thus increasing machining efficiency. With a control unit, the machine tool is able to obtain the optimal cutting precision during high-speed operations.

Figure 5:
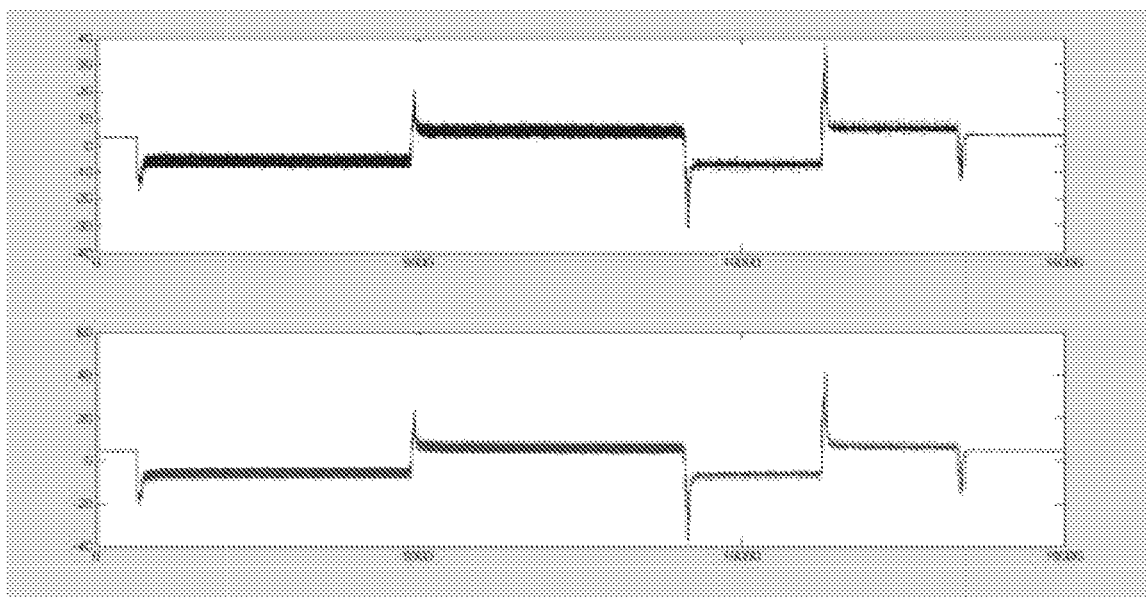
FIG. 5 is a graph showing the magnitudes of driving electrical signals of X- and Y-axis fed at 500 mm/min and 4000 mm/min during no-load condition.
Figure 6:
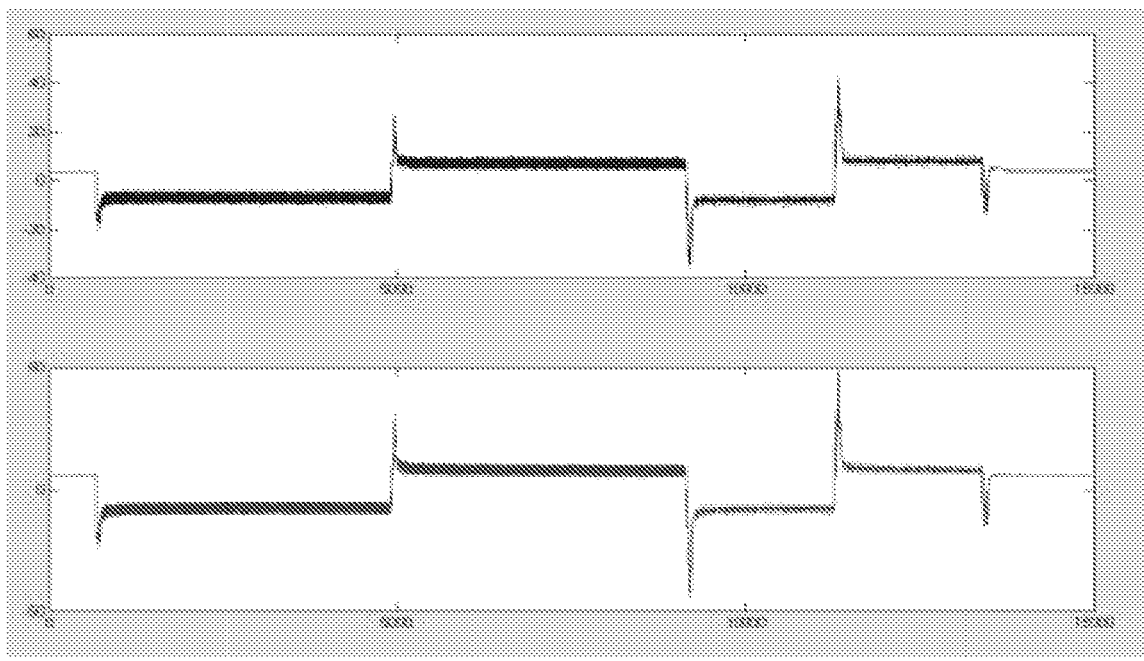
FIG. 6 is a graph showing the magnitudes of driving electrical signals of X- and Y-axes fed at 500 mm/min and 4000 mm/min during a 357 g-loading condition.

One feature of the present invention contemplates the relationship between the electrical signal sent by the power supply module and the workpiece. When the workpiece is heavier, the generated on the loading platform is greater. When the kinetic friction increases, the kinetic torque also increases, this in turns increases the torsion required to be outputted by the driving module for driving the loading platform. Accordingly, the electrical signal received by the driving module increases. As shown in FIGS. 4 and 5, driving electrical signals of X- and Y-axes fed, respectively, at 500 mm/min and 4000 mm/min are measured for a loading platform with no-load and with a 357 g load, respectively. When analyzing the relationship between the continuous output data of the electrical signals and the workpiece, the loading platform with no or some load is driven by the driving module in the positive X-axis, negative X-axis, positive Y-axis and negative Y-axis directions, and the continuous output data of the corresponding electrical signals are measured. Based on the data, the determining module may then correlate the workpiece and the continuous output data of the electrical signals corresponding to the loading platform having any load and driven in any two-dimensional direction, and determine the weight of the workpiece.

The parameter-optimized result is stored in the database. The parameters of the control unit are adjusted according to the load of the loading platform before operation is performed. This eliminates the tracking error attributed to a load with varying weights when the CNC machine tool is feeding in high speed.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. An apparatus for measuring the weight of a Computer Numerical Control (CNC) workpiece, including:
  a loading platform;
  a workpiece secured on the loading platform;
  a power supply module for supplying an electrical signal;
  a driving module for receiving the electrical signal and driving the loading platform in a constant speed based on the electrical signal; and
  a determining module for receiving the electrical signal from the power supply module and detecting a continuous data of the electrical signal to determine the weight of the workpiece based according to the continuous data, wherein the determining module further includes a database, storing the weight information of various workpiece and the data of the electrical signal corresponding to the weight of each workpiece.

2. An apparatus for measuring the weight of a workpiece of claim 1, wherein the driving module is a servo motor.

3. An apparatus for measuring the weight of a workpiece of claim 1, wherein the electrical signal is a current.

4. An apparatus for measuring the weight of a workpiece of claim 1, wherein the driving module includes a horizontal servo motor and a vertical servo motor.

5. An apparatus for measuring the weight of a workpiece of claim 4, wherein the electrical signal includes a current of the horizontal servo motor and a current of the vertical servo motor.

6. An apparatus for measuring the weight of a workpiece of claim 1, wherein the electrical signal includes an electrical signal for causing the loading platform to move from a first location to a second location.

7. An apparatus for measuring the weight of a workpiece of claim 1, wherein the electrical signal includes an electrical signal for causing the loading platform to move from a first location to a second location and an electrical signal for causing the loading platform to move from the second location back to the first location.

8. An apparatus for measuring the weight of a workpiece of claim 1, wherein the power supply module detects the velocity of the loading platform and outputs the electrical signal that keeps the loading platform moving in constant speed based on the detected velocity.

9. An apparatus for measuring the weight of a workpiece of claim 1, wherein the determining module further includes a neural network for outputting the weight of the workpiece based on the electrical signal.

10. An apparatus for measuring the weight of a workpiece of claim 9, wherein the neural network is trained based on the weights of various workpieces and the data of the electrical signal corresponding to the weight of each workpiece.

11. An apparatus for measuring the weight of a workpiece of claim 1, further including a CNC machine tool with an integrated control unit, the weight of the workpiece is outputted from the determining module to the control unit so as to adjust a fine-tuning parameter of the CNC machine tool.

12. A method for measuring the weight of a Computer Numerical Control (CNC) workpiece, including:
  providing a workpiece on a loading platform that includes a driving module;
  a power supply module supplying an electrical signal to the driving module;
  the driving module driving the loading platform in constant speed based on the electrical signal; and
  providing a determining module, wherein the determining module detects a continuous data of the electrical signal and determines the weight of the workpiece based on the continuous data, wherein the determining module further includes a database, storing the weight information of various workpiece and the data of the electrical signal corresponding to the weight of each workpiece.

13. A method for measuring the weight of a workpiece of claim 12, wherein the driving module is a servo motor.

14. A method for measuring the weight of a workpiece of claim 12, wherein the electrical signal is a current.

15. A method for measuring the weight of a workpiece of claim 12, wherein the driving module includes a horizontal servo motor and a vertical servo motor.

16. A method for measuring the weight of a workpiece of claim 15, wherein the electrical signal includes a current of the horizontal servo motor and a current of the vertical servo motor.

17. A method for measuring the weight of a workpiece of claim 12, wherein the electrical signal includes an electrical signal for causing the loading platform to move from a first location to a second location.

18. A method for measuring the weight of a workpiece of claim 12, wherein the electrical signal includes an electrical signal for causing the loading platform to move from a first location to a second location and an electrical signal for causing the loading platform to move from the second location back to the first location.

19. A method for measuring the weight of a workpiece of claim 12, wherein the power supply module detects the velocity of the loading platform and outputs the electrical signal that keeps the loading platform moving in constant speed based on the detected velocity.

20. A method for measuring the weight of a workpiece of claim 12, wherein the determining module further includes a neural network for outputting the weight of the workpiece based on the electrical signal.

21. A method for measuring the weight of a workpiece of claim 20, wherein the neural network is trained based on the weights of various workpieces and the data of the electrical signal corresponding to the weight of each workpiece.

22. A method for measuring the weight of a workpiece of claim 12, further including outputting the weight of the workpiece from the determining module to a CNC machine tool with an integrated control unit so as to adjust a fine-tuning parameter of the CNC machine tool.

* * * * *